J. A. SESLER.
FOOD HOLDING APPLIANCE FOR COOKING UTENSILS.
APPLICATION FILED JUNE 18, 1915.
1,189,498.
Patented July 4, 1916.
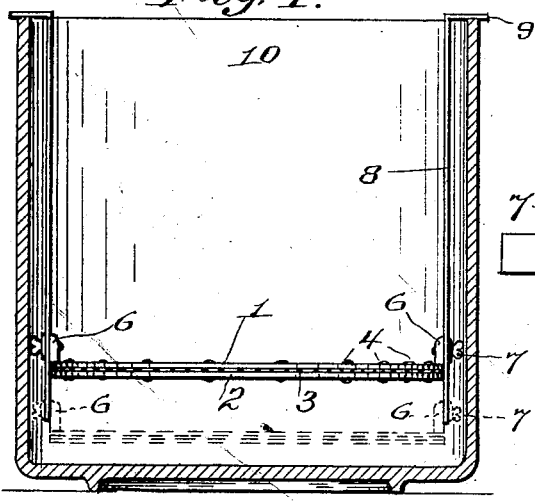
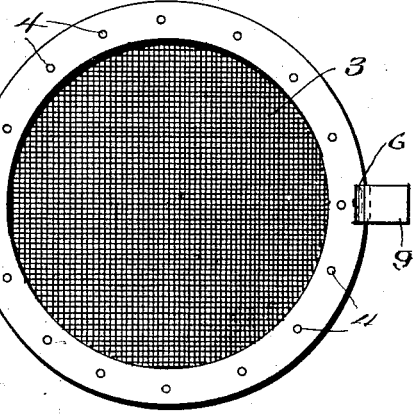
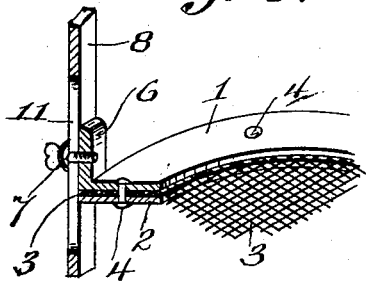
Witnesses:
C. J. Belt
R. F. Lansdale
Inventor:
Julia Ann Sesler
By
Tabert Whitman Co.
Attorneys.

UNITED STATES PATENT OFFICE.

JULIA ANN SESLER, OF CHRISTIANSBURG, VIRGINIA.

FOOD-HOLDING APPLIANCE FOR COOKING UTENSILS.

1,189,498.

Specification of Letters Patent. Patented July 4, 1916.

Application filed June 18, 1915. Serial No. 34,850.

*To all whom it may concern:*

Be it known that I, JULIA ANN SESLER, a citizen of the United States, residing at Christiansburg, in the county of Montgomery and State of Virginia, have invented certain new and useful Improvements in Food-Holding Appliances for Cooking Utensils, of which the following is a specification.

This invention relates to cooking utensils, and pertains especially to cooking utensil appliances for holding or suspending articles of food during the process of cooking.

The object of the invention is to provide an improved novel appliance for holding various articles of food within cooking utensils during the cooking thereof, whereby the articles of food are suspended in a utensil during a cooking process, and whereby the articles are afforded uniform cooking to the avoidance of scorching or overcooking in any particular part or parts thereof.

In the accompanying drawings forming part of this application:—Figure 1 is a sectional view of a cooking utensil showing the application of my invention. Fig. 2 is a top view of the holder. Fig. 3 is a sectional perspective detail view partly broken away.

The same reference characters denote the same part throughout the several views of the drawings.

It has been found that, in order to hold or suspend foods of various character and size in a boiler or other cooking utensil, it is necessary to employ closely woven or fine wire mesh, or a wire netting of sufficient strength as to support the food and yet prevent the food from passing therethrough. Obviously such supporting net work requires to be braced so as to hold it in proper stretched position, and obviously there should not be any solder or heat affecting joints or connections in the holder. Therefore I have devised means for utilizing fine wire mesh or gauze to the exclusion of solder or other heat-melting elements, and of such character as will permit free circulation of water therethrough, and as will support and hold food articles of various size and character without permitting the food articles to pass through the supporting wire. The suspended holder comprises a pair of thin circular plates forming rings 1 and 2, between which the wire netting 3 of fine mesh is clamped by means of rivets 4. The ring plates are of sufficient width as to overlap the wire so as to form a solid stiff plate rim for the food supporting wire 3. The top ring 1 is provided with a pair of peripheral lugs 6 having a screw aperture for a thumb screw 7. The width of the plates also affording additional support of the food.

The suspending arms 8 are provided at the top with a flange 9 for engaging the periphery of a cooking utensil as 10, and the lower end of said arms has a slot 11 through which the thumb screws 7 extend. This connection affords means for adjusting the wire holder according to the depth of a cooking vessel so that said holder may be suspended in proper or desired relation to the bottom of the vessel. It will be observed that I am able to use fine mesh wire to greater advantage than the usual coarse mesh of plaited strains of heavy wire; that I furnish a complete device without using solder; and that the suspended holder is capable of expeditious vertical adjustment as desired or as occasion may demand.

I do not wish to limit my invention to any particular size or material, nor to the number of suspending arms, but reserve the right to make such changes and variations in the practical manufacture and application of my invention as may come within the scope of the appended claim.

Having thus described my invention what I claim as new and desire to secure by Letters Patent is:—

A food supporting appliance for cooking utensils, comprising a pair of rings each having an annular plate surface forming a food rest, a wire netting covering the ring openings and extending between the plates to the outer periphery of the rings, a plurality of clamping rivets extending through the plates and through the wire, a pair of lugs formed on the outer periphery of one of the plates and projecting upwardly and outwardly therefrom, a pair of slotted hangers engaging the top of the utensil and depending below the plate rings, and set screws extending through the slots and screwing into said lugs for adjustably suspending the plate rings, substantially as set forth.

In testimony whereof I affix my signature in presence of two witnesses.

JULIA ANN SESLER.

Witnesses:
   Mrs. C. A. YEAROUT,
   JOHN T. SESLER.